(12) United States Patent
Rocca

(10) Patent No.: US 7,609,816 B2
(45) Date of Patent: Oct. 27, 2009

(54) RENEWABLE LASER TARGET

(75) Inventor: Jorge J. Rocca, Fort Collins, CO (US)

(73) Assignee: Colorado State University Research Foundation, Fort Collins, CO (US)

(*) Notice: Subject to any disclaimer, the term of this patent is extended or adjusted under 35 U.S.C. 154(b) by 178 days.

(21) Appl. No.: 11/751,568

(22) Filed: May 21, 2007

(65) Prior Publication Data

US 2009/0016493 A1    Jan. 15, 2009

Related U.S. Application Data

(60) Provisional application No. 60/747,740, filed on May 19, 2006.

(51) Int. Cl.
*H01J 35/08* (2006.01)

(52) U.S. Cl. ........................ 378/143; 378/125

(58) Field of Classification Search ................. 378/143, 378/125, 124, 144, 119; 250/504 R, 517.21, 250/517.1, 503.1, 498.1
See application file for complete search history.

(56) References Cited

U.S. PATENT DOCUMENTS

| 4,700,371 | A |   | 10/1987 | Forsyth et al. |
|---|---|---|---|---|
| 5,117,432 | A |   | 5/1992 | Nilsen |
| 5,175,757 | A | * | 12/1992 | Augustoni et al. .......... 378/120 |
| 5,459,771 | A |   | 10/1995 | Richardson et al. |
| 5,577,091 | A |   | 11/1996 | Richardson et al. |
| 5,606,588 | A |   | 2/1997 | Umstadter et al. |
| 6,377,651 | B1 |   | 4/2002 | Richardson et al. |
| 6,647,088 | B1 |   | 11/2003 | Schmidt et al. |
| 6,865,255 | B2 |   | 3/2005 | Richardson |
| 2007/0269014 | A1 | * | 11/2007 | Safai et al. .................. 378/143 |

OTHER PUBLICATIONS

B.R. Benware, et al. "Demonstration of a high average power table-top soft x-ray laser," Phys. Rev. Lett. 81, 5804-5806 (1998).
J.J. Rocca, et al. "Capillary discharge tabletop soft X-ray lasers reach new wavelengths and applications," C.R. Acad. Sci Paris 1, 1065-1081 (2000).
S. Sebban, et al. "Saturated amplification of a collisionally pumped optical-field-ionization soft X-ray laser at 41.8 nm," Phys. Rev. Lett. 86, 3004-30007 (2001).
S. Sebban, et al. "Demonstration of a Ni-like Kr optical-field-ionization collisional soft X-ray laser at 32.8 nm," Phys. Rev. Lett. 89, Art. #253901(2002).

(Continued)

*Primary Examiner*—Hoon Song
(74) *Attorney, Agent, or Firm*—Samuel M. Freund; Cochran Freund & Young LLC

(57) ABSTRACT

Generation of 2 μW average output power at 13.9 nm from a table-top laser-pumped Ni-like Ag laser operating at 5 Hz repetition rate using a silver-coated helical target which is rotated and advanced such that the target surface is renewed between pulses, is described. Greater than $2 \times 10^4$ soft x-ray laser pulses were obtained using a single target. Similar results were obtained at 13.2 nm for Ni-like Cd using a cadmium-coated target. Uninterrupted operation of laser-pumped soft x-ray lasers at a repetition rates of about 10 Hz for periods of several hours enables the generation of pulsed, high average power soft x-rays for applications. Other embodiments of the renewable laser target are described.

11 Claims, 4 Drawing Sheets

OTHER PUBLICATIONS

D.V. Korobkin, et al. "Demonstration of soft x-ray lasing to ground state in Li III," Phys. Rev. Lett. 77, 5206-5209 (1996).

T. Ozaki, et al. "Highly directive 18.9 nm nickel-like molybdenum X-ray laser operating at 150 mJ pump energy," Phys. Rev. Lett. 89, Art. #253902 (2002).

P.V. Nickles, et al. "Short pulse x-ray laser 32.6 nm based on transient gain in Ne-like titanium," Phys. Rev. Lett. 78, 2748-2751 (1997).

J. Dunn, et al. "Gain saturation regime for laser-driven tabletop, transient Ni-like ion x-ray lasers," Phys. Rev. Lett. 84, 4834-4837 (2000).

R. Keenan, et al. "High repetition rate grazing incidence pumped X-ray laser operating at 18.9 nm," Phys. Rev. Lett. 94, art. 103901, (2005).

B.M. Luther, et al. "Saturated high-repetition-rate18.9-nm tabletop laser in nickle like molybdenum," Opt. Lett. 30, 165-167 (2005).

Y. Wang, et al. "Demonstration of high-repetiton-rate tabletop soft-x-ray lasers with saturated output at wavelengths down to 13.9 nm and gain down to 10.9 nm," Phys. Rev. A 72, Art. #053807, (2005).

J.J. Rocca, et al. "Saturated 13.2 nm high-repetition-rate laser in nickel like cadmium," Opt. Lett. 30, 2581-2583 (2005).

D. Alessi, et al. "High repetition rate operation of saturated table-top soft x-ray lasers in transitions of neon-like ions near 30 nm," Opt. Express 13, 2093-20098 (2005).

M.A. Larotonda, et al. "Characteristics of a saturated 18.9-nm table-top laser operating at 5-Hz repetition rate," IEEE J. Sel. Top. Quantum Electon., 10, 1363-1367 (2004).

\* cited by examiner

RENEWABLE LASER TARGET

CROSS REFERENCE TO RELATED APPLICATIONS

This application claims the benefit of Provisional Patent Application No. 60/747,740, entitled "Helical Renewable Laser Target," filed on May 19, 2006. The entire content of this application is hereby specifically incorporated by reference herein for all it discloses and teaches.

STATEMENT REGARDING FEDERAL RIGHTS

This invention was made with government support under NSF Award Number EEC-0310717 to the NSF Center for Extreme Ultraviolet Science and Technology. The government has certain rights in the invention.

FIELD OF THE INVENTION

The present invention relates generally to soft x-ray lasers and, more particularly, to renewable targets suitable for permitting prolonged, uninterrupted pulsed operation for laser-pumped, gain-saturated soft x-ray lasers.

BACKGROUND OF THE INVENTION

Prolonged repetitive operation of pulsed lasers at optical wavelengths has been available for several decades and has made possible the implementation of numerous applications requiring intense pulses of coherent infrared, visible, and ultraviolet light. To extend and develop these applications at shorter wavelengths requires high repetition rate operation of soft x-ray laser amplifiers in the gain-saturation regime. A renewable gain medium that allows the uninterrupted generation of long series of laser pulses is desirable. Capillary discharge lasers based on the excitation of a gas by a fast discharge current pulse were the first soft x-ray lasers to achieve prolonged operation in the gain-saturated regime at a repetition rate of up to 10 Hz [See, e.g., B. R. Benware et al. "Demonstration of a high average power tabletop soft x-ray laser," Phys. Rev. Lett. 81, 5804-5806 (1998).]. This made possible the use of a Ne-like Ar laser emitting at 46.9 nm in several applications [See, e.g., J. J. Rocca et al. "Capillary discharge tabletop soft X-ray lasers reach new wavelengths and applications," C. R. Acad. Sci. Paris 1, 1065-1081 (2000), and in references cited therein.]. Soft x-ray lasers based on optical field ionization of gaseous targets emitting at wavelengths longer than 30 nm have also been demonstrated to operate repetitively in the gain-saturated regime [See, e.g., S. Sebban, et al. "Saturated amplification of a collisionally pumped optical-field-ionization soft X-ray laser at 41.8 nm," Phys. Rev. Lett. 86, 3004-3007 (2001); and S. Sebban et al. "Demonstration of a Ni-like Kr optical-field-ionization collisional soft X-ray laser at 32.8 nm," Phys. Rev. Lett. 89, Art. # 253901 (2002).]. Several experiments have demonstrated soft x-ray laser amplification at multi-Hz repetition rates, but without achieving the gain-saturated amplification levels necessary to produce significant average power [See, e.g., D. V. Korobkin et al. "Demonstration of soft x-ray lasing to ground state in Li III," Phys. Rev. Lett. 77, 5206-5209 (1996); and T. Ozaki et al. "Highly directive 18.9 nm nickel-like molybdenum X-ray laser operating at 150 mJ pump energy," Phys. Rev. Lett. 89, Art. # 253902 (2002).

Transient collisional electron excitation of plasmas by normal incidence irradiation of solid targets with a nanosecond pulse followed by a picosecond pump pulse of 3-10 J energy has produced several saturated lasers in the 12-33 nm range, at repetition rates of one pulse every several minutes [See, e.g., P. V. Nickles et al. "Short pulse x-ray laser 32.6 nm based on transient gain in Ne-like titanium," Phys. Rev. Lett. 78, 2748-2751 (1997); and J. Dunn et al. "Gain saturation regime for laser-driven tabletop, transient Ni-like ion x-ray lasers," Phys. Rev. Lett. 84, 4834-4837 (2000).]. Recently, the laser pump energy required to obtain gain-saturated operation of soft x-ray lasers has been significantly reduced by directing the picosecond pump pulse at a grazing angle of incidence into the pre-created plasma [See, e.g., R. Keenan et al. "High repetition rate grazing incidence pumped X-ray laser operating at 18.9 nm," Phys. Rev. Lett. 94, art. 103901, (2005); B. M. Luther et al. "Saturated high-repetition-rate 18.9-nm tabletop laser in nickel like molybdenum," Opt. Lett. 30, 165-167 (2005); Y. Wang et al. "Demonstration of saturated high repetition rate tabletop soft x-ray lasers at wavelengths down to 13.9 nm and gain down to 10.9 nm", Phys. Rev. A 72, Art. # 053807, (2005); J. J. Rocca et al. "Saturated 13.2 nm high-repetition-rate laser in nickel like cadmium", Opt. Lett. 30, 2581-2583 (2005); D. Alessi et al. "High repetition rate operation of saturated table-top soft x-ray lasers in transitions of neon-like ions near 30 nm," Opt. Express 13, 2093-2098 (2005); and M. A. Larotonda et al. "Characteristics of a saturated 18.9-nm tabletop laser operating at 5-Hz repetition rate", *IEEE J. Sel. Top. Quantum Electron.*, 10, 1363-1367 (2004).]. The use of picosecond-duration pump laser pulses with energies up to 1 J impinging at grazing incidence angles between 140 and 230 resulted in gain-saturated laser emission for transitions of Ni-like ions [See, e.g., R. Keenan et al., supra; B. M. Luther et al., supra; Y. Wang et al., supra; and J. J. Rocca et al., supra.] and Ne-like ions [See, e.g., D. Alessi et al., supra.] at wavelengths as short as 13.2 nm for Ni-like Cd. These lasers were demonstrated to operate at repetition rates of between 5 and 10 Hz by pumping polished slab targets of the selected laser element. The number of laser pulses that can be obtained using the same target surface depends on the target material; for example, for Ni-like Mo, between 20 and 30 laser pulses were obtained without moving the target, while for Ni-like Ag or Ni-like Cd, the laser output intensity was observed to degrade after only 2 to 3 pulses of the pump laser on the same target surface.

U.S. Pat. No. 5,175,757 for "Apparatus And Method To Enhance X-Ray Production In Laser Produced Plasmas" which issued to Arnold L. Augustoni et al. on Dec. 29, 1992 describes a rotatably mounted high purity copper rod, such as that illustrated in U.S. Pat. No. 4,700,371 for "Long Life X-Ray Source Target" which issued to James M. Forsyth et al. on Oct. 13, 1987. Therein, the inventors describe a cylindrical drum which is both rotated and translated to allow a laser pulse to intersect points along a helical pattern on the drum. Both patents teach the generation of incoherent x-radiation.

Accordingly, it is an object of embodiments of the present invention to provide a laser target effective for generating laser-pumped lasing in the x-ray region of the electromagnetic spectrum from a chosen element.

It is also an object of the present invention to provide a laser target effective for generating laser-pumped lasing in the x-ray region of the electromagnetic spectrum from a chosen element, and having a renewable target surface.

It is yet another object of the present invention to provide a laser target effective for generating laser-pumped lasing in the x-ray region of the electromagnetic spectrum from a chosen element, having a renewable target surface and having reduced x-ray absorption by cooler plasma species generated by the pump laser.

It is still another object of the present invention to provide a laser target effective for generating laser-pumped lasing in the x-ray region of the electromagnetic spectrum from a chosen element, and having a renewable target surface, having reduced x-ray absorption from cooler plasma species generated by the pump laser, such that the radiation from the pump laser does not have to be redirected between pulses.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the renewable, laser-pumped target for generating soft x-ray laser radiation, hereof, includes in combination: a cylindrical body having an outer surface, an axis of symmetry, a first end and a second end, wherein a helical step having a rectangular cross section and a flat outer surface on which a pump-laser beam target area is defined for a chosen pump-laser beam geometry, is formed in the outer surface of said cylindrical body; and means for rotating and translating the cylindrical body such that the pump-laser beam target area is refreshed while maintaining the geometry of the laser beam.

In another aspect of the present invention and in accordance with its objects and purposes, the method for producing a renewable, laser-pumped soft x-ray laser target, hereof, includes the steps of: forming a helical step having a rectangular cross section in the outer surface of a cylindrical body on which a pump-laser beam target area is defined for a chosen pump-laser beam geometry, the cylindrical body having an axis of symmetry; incrementally rotating the cylindrical body about the axis of symmetry thereof while advancing the cylindrical body along the axis of symmetry thereof with each incremental rotation of the cylindrical body, such that the pump-laser beam target area is refreshed while maintaining the chosen pump-laser beam geometry with each incremental rotation of the cylindrical body.

In still another aspect of the invention and in accordance with its objects and purposes, the renewable, laser-pumped soft x-ray target hereof includes in combination: an elongated body having a polygonal cross section with flat faces, an axis of symmetry, and an outer surface on which a pump-laser beam target area is defined for a chosen pump-laser beam geometry; means for rotating the elongated body about the axis of symmetry thereof, thereby exposing another face of the polygon such that the target area is refreshed while maintaining the geometry of the pump-laser beam for each rotation of the target; and means for translating the elongated body along the axis of symmetry thereof such that the target area is refreshed while maintaining the geometry of the pump-laser beam for each translation of the target.

In yet another aspect of the present invention and in accordance with its objects and purposes, the method for producing a renewable, laser-pumped target for generating soft x-ray radiation, hereof, includes the steps of forming an elongated body having a polygonal cross section with flat outer faces on which a pump-laser beam target area is defined for a chosen pump-laser beam geometry, and having an axis of symmetry; rotating the elongated body about the axis of symmetry thereof, thereby exposing another face of the polygon such that the pump-laser target area is refreshed while maintaining the chosen pump-laser geometry for each rotation; and translating the elongated body along the axis of symmetry thereof such that the pump-laser target area is refreshed while maintaining the chosen pump-laser geometry for each translation.

Benefits and advantages of the present invention include, but are not limited to, providing a laser target effective for generating laser-pumped lasing in the soft x-ray region of the electromagnetic spectrum from a chosen element and having a renewable target surface, such that x-ray absorption from cooler surrounding plasma species generated by the pump laser is minimized, such that reproducible laser energy per pulse is produced, such that prolonged, uninterrupted laser operation is possible, and such that the laser radiation from the pump laser does not have to be moved between pulses.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a helical renewable laser target embodiment of the present invention effective for generating prolonged, uninterrupted pulses of soft x-radiation at high repetition rates, while

FIG. 3B is a top view of the elongated laser target illustrated in FIG. 3A hereof, showing longitudinal notches disposed between the faces of the target, while

DETAILED DESCRIPTION OF THE INVENTION

Briefly, the present invention includes quasi-continuous operation of a saturated, 13.9 nm Ni-like Ag soft x-ray laser at approximately 10 Hz repetition rate using a renewable target that permits uninterrupted soft x-ray laser output for a period of hours. Other atomic species may be used depending on the wavelengths of soft x-radiation desired. An average power of 2 µW and high average spectral brightness of $1.3 \times 10^{13}$ photons $mm^{-2}$ $mrad^{-2}$ $s^{-1}$ $(0.1\% BW)^{-1}$ at 13.9 nm was observed. A silver-coated solid helicoidal target is rotated and advanced to renew the target surface between pump laser pulses, thereby enabling prolonged generation of high average power. The plasma comprising the soft x-ray laser gain media was generated by focusing the 800 nm wavelength beam of a Ti: sapphire pump laser onto the outer-most surface of the helical target to form a line-focus 30 μm wide and 4 mm long.

Greater than $2\times10^4$ soft x-ray laser pulses were obtained at a 5 Hz repetition rate using a single target having a useful spiral perimeter length of 96 cm and rotated at a tangential speed of 0.2 mm s$^{-1}$. An increase of the number of laser pulses supported by the target to about $5\times10^4$ was achieved by reducing the tangential rotation velocity to 0.1 mm s$^{-1}$ at the expense of an about 20 percent reduction in soft x-ray laser average power. The present laser target apparatus will permit uninterrupted saturated operation of laser-pumped table-top collisional soft x-ray lasers at a repetition rate of about 10 Hz for approximately 2 hours.

Figure 1A:
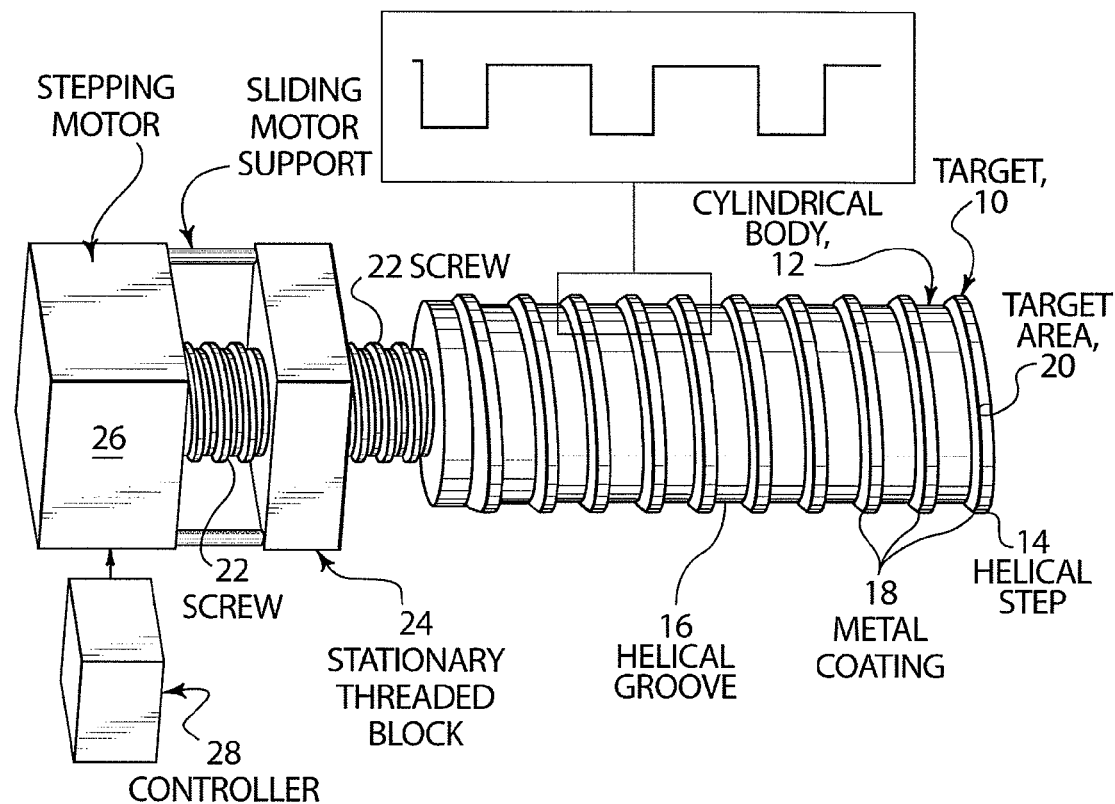

Reference will now be made in detail to the present embodiments of the invention, examples of which are illustrated in the accompanying drawings. In the Figures, similar structure will be identified using identical callouts. Turning now to FIG. 1, a schematic representation of the helical renewable laser target of the present invention is shown in FIG. 1A. Target, 10, includes a solid cylindrical body, 12, having a diameter of 30 mm and length of 63 mm. The outer surface of cylinder 12 was machined to form a helical step, 14, having rectangular cross section with a 4 mm wide top surface and a 6 mm period, and helical groove, 16, having a depth of 3 mm and a width of 2.4 mm. Cylindrical body 12 was fabricated from electrolytic copper, onto which an approximately 20 μm thick silver coating was electroplated. Other coatings may be chosen depending on the desired wavelength of the x-ray laser radiation. Clearly, solid targets of the chosen material may also be employed. Target area, 20, is a chosen location on the outer surface of helical step 14. Cylinder 12 was mounted on screw, 22, having a pitch effective for rotating and advancing the target surface while the position of target area 20 (4 mm wide stripe) remains stationary relative to the focal position of the pump laser beams, as will be described in more detail hereinbelow. Stationary threaded block, 24, and stepping motor, 26, cooperate to rotate and advance screw 22 relative to block 24, thereby renewing the target surface irradiated by the pump beam. Stepping motor 26 may be mounted on a sliding stage (not shown in FIG. 1A). Controller 28 controls stepping motor 26 in response to the desired pulse rate of the pump laser.

It should be mentioned that DC motors may also be utilized to rotate screw 22 in accordance with the teachings of the present invention. Moreover, other apparatus for rotating and advancing cylindrical body 12 such that target area 20 remains stationary relative to the focal position of the pump laser beams may be anticipated. For example, reproducible, computer-controlled, commercially available translation and rotation apparatus may be combined to achieve the same effect.

Figure 1B:
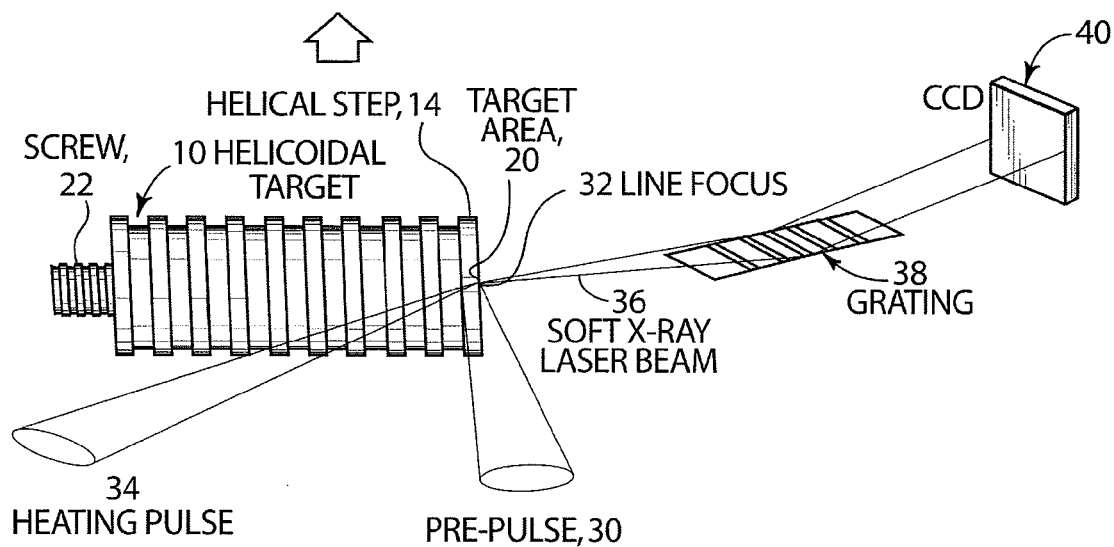
FIG. 1B shows the definition of the target area on the renewable laser target shown in FIG. 1A hereof relative to the focus location for the pre-pulse and heating pulse laser beams and the resulting soft x-ray laser beam.

FIG. 1B illustrates the formation of the gain medium plasma by irradiating the outer surface of silver-coated helicoidal target 14 on target area 20 at near normal incidence with a sequence of an early prepulse, 30, of 120 ps duration and an approximately 10 mJ energy, followed after about 5 ns by a main prepulse (also designated as callout 30) having the same duration as the early prepulse and having about 350 mJ energy. The pre-pulse beams were focused into a 4.1 mm long×30 μm wide line, 32, using the combination of an f=67.5 cm spherical lens and an f=200 cm cylindrical lens (not shown in FIG. 1B). After a chosen delay of 300 ps (100 ps for Cd) an 8 ps duration heating pulse, 34, having approximately 1 J energy was caused to impinge on line focus, 32, at a grazing incidence angle of about 230. The picosecond heating pulse was also focused into a 30 μm FWHM wide line using an f=76.2 cm focal length multilayer-coated parabolic mirror (not shown in FIG. 1B) placed at 70 from normal incidence. The off-axis placement of the paraboloid formed an astigmatic focus that resulted in a line that was further elongated to about 4.1 mm when intercepted at grazing incidence by target area 20. Plasma emission was monitored using a flat field spectrograph composed of a 1200 l/mm gold-coated spherical grating, 38, having a variably spaced ruling positioned at 870, and a 2.5×2.5 cm$^2$, back-illuminated CCD detector array, 40, placed in the image plane of grating 38 located at 48 cm from the target. The plasma emission was filtered with a 0.34 μm thick Zr film (not shown in FIG. 1B) and was attenuated using metallic meshes (not shown in FIG. 1B) with a total transmission of 3.6% to avoid saturation of CCD detector.

A portion of the pump laser energy overflowing the surface of helical step 14 may impinge on the surface of helical groove 16, thereby generating a cooler plasma at that surface. An advantage of the helical step of the present invention is that the cooler plasma does not significantly diminish the x-ray laser intensity as a result of absorption thereof since the present lasing process has short duration and terminates before the cooler plasma reaches the excitation region.

Figure 2:
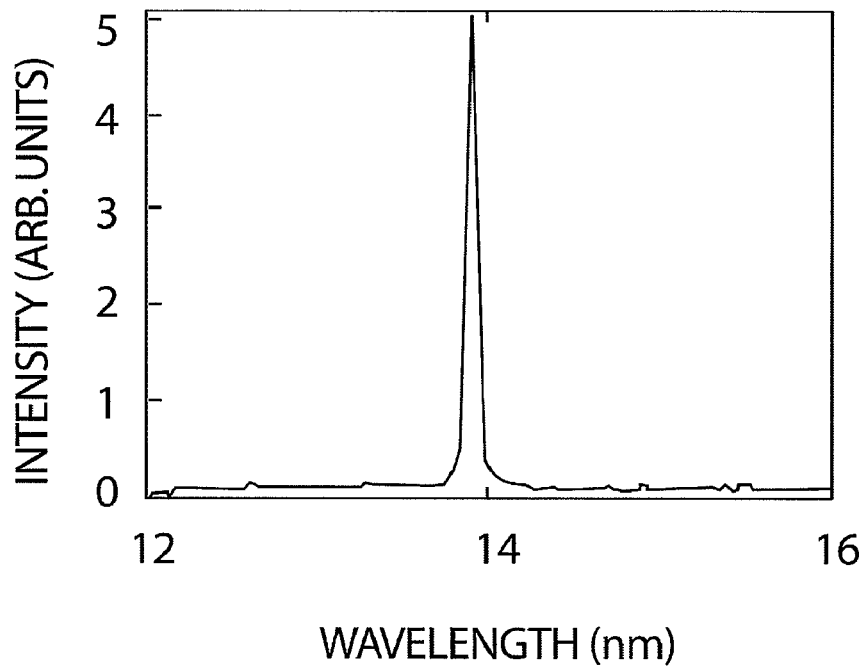
FIG. 2 is a spectrum of the emission from a Ni-like Ag laser operating at 5 Hz repetition rate generated using the laser target illustrated in FIGS. 1A and 1B hereof.

FIG. 2 is a single-pulse spectrum of the axial emission of a silver plasma generated by heating helicoidal target area 20. The 13.9 nm line of Ni-like Ag is observed to completely dominate the spectrum. The most intense laser pulses were measured to have energies of about 850 nJ. This laser intensity is similar to that obtained using a flat polished Ag slab target, for which the measured gain-length product of 16.8 and observed output intensity indicate operation in the gain-saturated regime [See, e.g., Wang et al., supra.]. Pulse-to-pulse variations in the intensity of laser output pulses at 5 Hz repetition rate were obtained by reducing the required CCD readout time by binning the pixels of the detector array and limiting the detector area read after each pulse.

Directing a second pump laser pulse onto the same silver target surface 20 resulted in decreased laser output intensity. Full recovery of the laser intensity was observed when the target was rotated to displace the ablated target surface by at least 40 μm. A tangential target velocity of 0.2 mm s$^{-1}$ was therefore selected for soft x-ray laser operation at 5 Hz repetition rate. An increase of the rotation velocity beyond this point did not result in a significant increase in x-ray laser output energy. By contrast, a reduction of the tangential velocity of the target to 0.1 mm s$^{-1}$, thereby doubling the number of pulses than can obtained from a single target by partially overlapping the target regions directly irradiated by the laser beam in two contiguous pulses, was observed to reduce the soft x-ray laser output energy per pulse by about 20%.

Contiguous series of 250 laser pulses, each obtained at intervals of 5 min., and having an average laser pulse energy of 400 nJ corresponding to an average power of 2 μW, were observed to have a pulse-to-pulse variation characterized by a standard deviation of 19%. Longer series of pulses showed a continuous decrease of the output pulse energy after approximately 250 pulses. This decrease in laser pulse energy was traced to degradation of the laser beam wavefront and line focus quality due to the thermal loading of the replica diffraction gratings of the pulse compressor. An interval of 4-5 minutes between each series of 250 pulses has been found to permit full recovery of the laser intensity. Thus, the use of master diffraction gratings should readily allow for uninterrupted operation of the 5 Hz laser for more than $5\times10^5$ laser shots, corresponding to more than 2 h of continuous laser operation. An increase in target length will allow for several hours of uninterrupted 10 Hz repetition rate laser operation and potentially double the average power to 4 μW using 0.2 mm s$^{-1}$ speeds. Laser operation at other soft x-ray wavelengths can be readily obtained by selecting an appropriate coating or solid cylinder material which allows lasing in transitions of other Ni-like or Ne-like ions, as examples. Similar results were obtained for the 13.2 nm line of Ni-like Cd by coating the target with Cd. A laser average output power of about 1 µW was generated for this line at 5 Hz repetition rate by moving the target at 0.2 mm s$^{-1}$.

The present x-ray laser target permits a combination of both high average power and high average spectral brightness in the 100 eV photon range for periods of hours as a result of the up to 10 Hz repetition rate possible. The 2 µW average power operation is equivalent to $1.5 \times 10^{11}$ photons/s, while the energy of the most intense pulses approaches 1 µJ. The estimated average brightness of a source having $1.3 \times 10^{13}$ photons mm$^{-2}$ mrad$^{-2}$ s$^{-1}$ (0.1% BW)$^{-1}$ is similar to that of some synchrotron bending magnets operating at the same photon wavelength. As a result of the measured short pulse duration of 5 ps (FWHM) for the Ag 13.9 nm line, high peak power of between 0.1 and 0.2 MW and peak spectral brightness of between about 0.5 and $1 \times 10^{24}$ photons mm$^{-2}$ mrad$^{-2}$ s$^{-1}$ (0.1% BW)$^{-1}$ can be achieved. This peak spectral brightness exceeds that for undulators operating at this wavelength by two to three orders of magnitude.

Figure 3A:
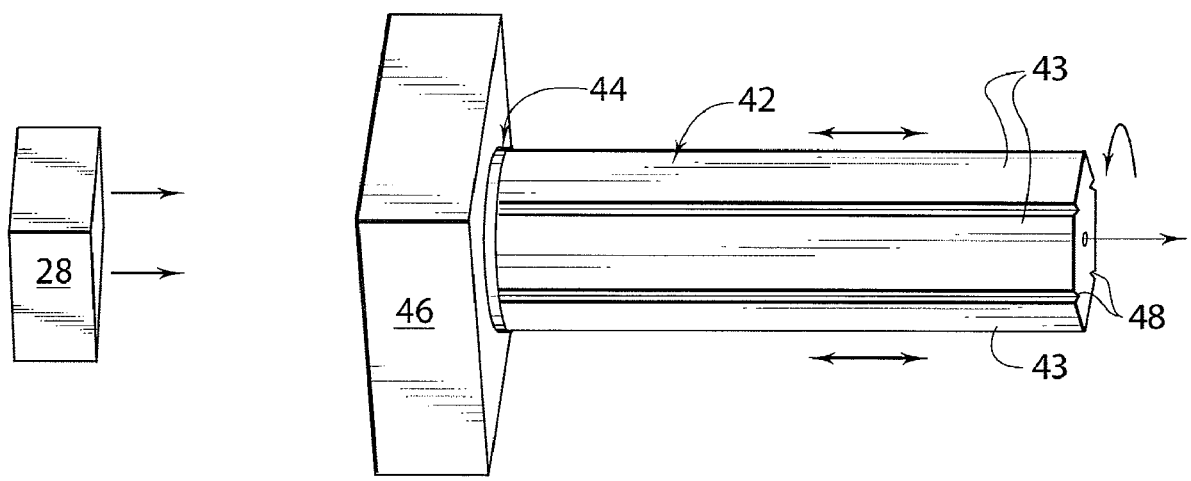
FIG. 3A is a schematic representation of another embodiment of the renewable laser target of the present invention effective for generating prolonged, uninterrupted pulses of soft x-radiation at high repetition rates, showing an elongated laser target having a polygonal cross section, shown in FIG. 3A as a hexagon.

FIG. 3A is a schematic representation of another embodiment of laser target, 42, having a polygonal cross section, shown in FIG. 3A as a hexagon with faces, 43. The target is mounted on a rotation apparatus, 44, for exposing other faces of the polygon which is mounted on translation apparatus, 46, the motions of both apparatus being directed by controller, 28. Longitudinal notches, 48, are emplaced along the edges of the faces in order to reduce the generation of a cooler boundary plasma resulting from a portion of the pump laser energy overflowing onto adjacent surfaces, and decreasing the x-ray laser output, due to absorption of laser photons as a result of photoionization of low-charge ions created from ablation of those adjacent surfaces. The width and number of faces employed in target 42, and the depth of notches 48 are chosen to achieve maximum soft x-ray laser amplification, and the depth of notches 48 is chosen such that absorption of the soft x-ray laser beam is minimized. Suitable target material may be deposited onto a chosen substrate material, or the target may be fabricated from the selected target material.

Reproducible, accurate computer-controlled, commercially available rotation 44 and translation 46 apparatus may be combined for rotating and/or longitudinally translating, respectively, target 42 such that target area 20 (FIG. 1) is refreshed while maintaining the chosen focal position geometry of the pump laser beams.

Also as discussed hereinabove, pre-pulse 30 and heating pulse 34 are directed to impinge onto one of the faces of the renewable target. When the x-ray laser output power drops below a determined value, the target is rotated, translated, or rotated and translated to expose a fresh surface.

Figure 3B:
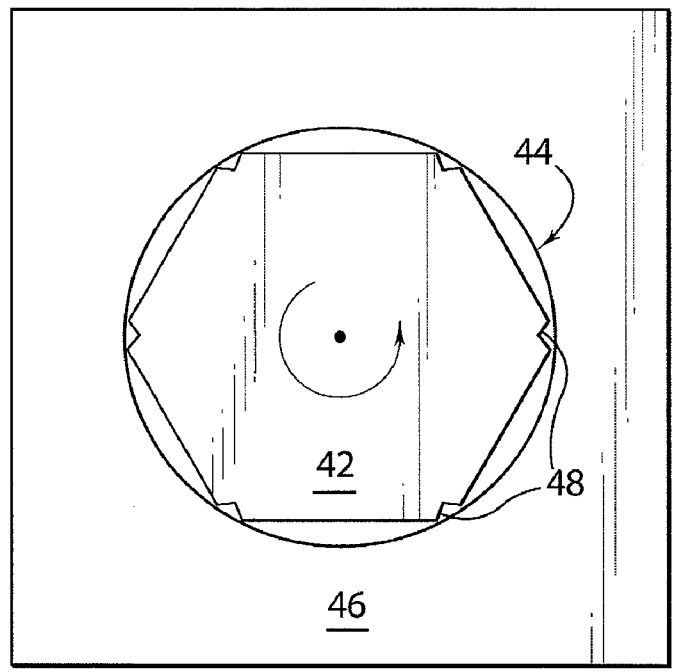
Figure 3C:
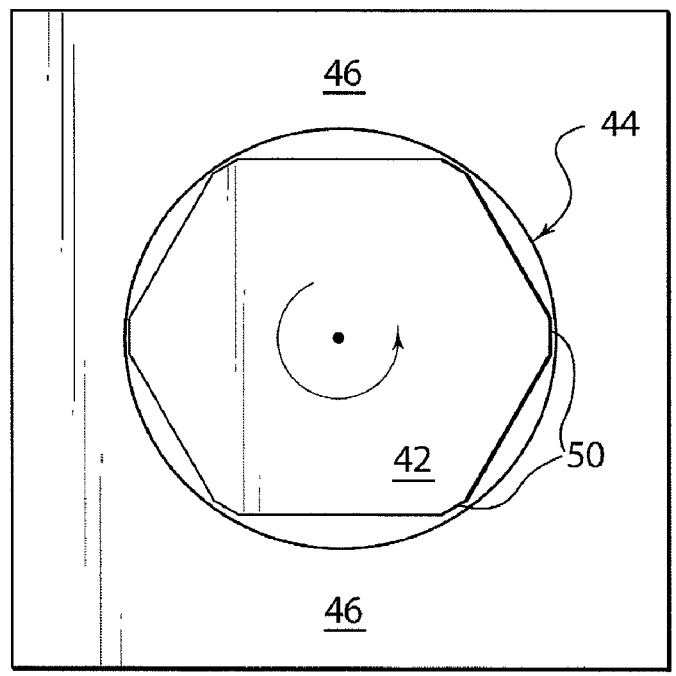
FIG. 3C is a top view of the elongated laser target shown in FIG. 3A hereof, showing longitudinally disposed beveled regions between the faces of the target.

FIG. 3B is a top view of the elongated laser target shown in FIG. 3A hereof, showing longitudinal notches 48 disposed between the faces of the target, while FIG. 3C is a top view of the elongated laser target shown in FIG. 3A hereof, showing beveled regions, 50, between the faces of the target to reduce the generation of a cooler edge plasma that can absorb the soft x-ray laser radiation, thereby decreasing the intensity of the soft x-ray laser output.

Figure 4:
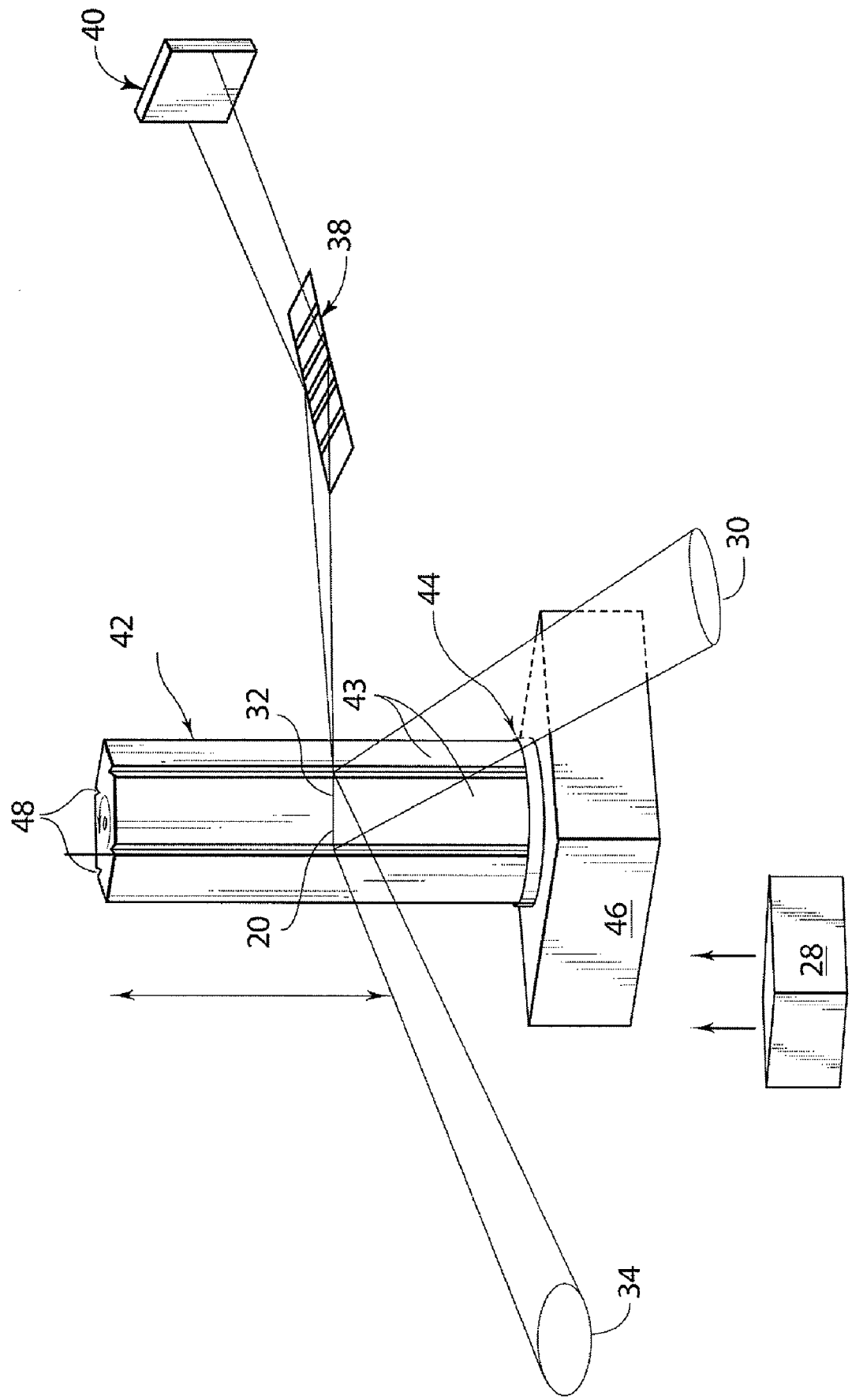
FIG. 4 is a schematic representation of the elongated laser target shown in FIG. 3A hereof suitable for generating prolonged, uninterrupted pulses of soft x-radiation at high repetition rates, illustrating the orientation of the target relative to the pumping lasers and the x-ray detection apparatus.

FIG. 4 is a schematic representation of the elongated laser target shown in FIG. 3A hereof suitable for generating prolonged, uninterrupted pulses of soft x-radiation at high repetition rates, illustrating the orientation of the target relative to the pumping lasers and the x-ray detection apparatus. Shown is hexagonal elongated target 42 having its longitudinal axis oriented in a vertical direction with both the pre-pulse laser beam 30 and the heating pulse 34 impinging on one of the faces 43. When the soft x-ray output 36 impinging on CCD 40 falls below a chosen value, target 42 may be raised or lowered using translation apparatus 46 under the direction of controller 28 to expose a new polygon face to laser beams 30 and 34 on the same face without having to change the orientation of the pump-laser beams, or resulting in the movement of the x-ray laser output beam 36. Alternatively, target 42 may be rotated to expose another of the faces 43 to laser beams 30 and 34 under the direction of controller 28 by means of rotation apparatus 44, also without changing the geometry of the pump-laser beams or the x-ray laser output. In other words, in a similar manner to the helical embodiment hereof, the pump-laser target area appears to be the same to the pump-laser beams when target 42 is either rotated or translated to refresh the irradiated surface. As described hereinabove, notches 48 reduce the likelihood of self-absorption of the generated soft x-ray laser radiation. Clearly, any number of faces 43 may be employed as long as the excited plasma is not significantly affected by plasmas formed as a result of spillover of the pump laser radiation onto these faces.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A renewable, laser-pumped target for generating soft x-ray radiation, comprising in combination:
   a cylindrical body having an outer surface, an axis of symmetry, a first end and a second end, wherein a helical step having a rectangular cross section and a flat outer surface on which a pump-laser beam target area is defined for a chosen pump-laser beam geometry, is formed in the outer surface of said cylindrical body; and
   means for rotating said cylindrical body about the axis of symmetry thereof, and translating said cylindrical body along the axis of symmetry thereof such that the pump-laser beam target area is refreshed while maintaining the chosen pump-laser beam geometry.

2. The apparatus of claim 1, wherein said means for rotating and translating said cylindrical body comprises:
   a screw having a chosen diameter and selected thread pitch attached to the first end of said cylindrical body along the axis of symmetry;
   a stationary threaded block adapted to receive said screw;
   a stepping motor for incrementally rotating said screw about the axis of symmetry; and
   means for controlling said stepping motor.

3. The apparatus of claim 1, wherein said means for rotating and translating said cylindrical body comprises:
   rotation apparatus;
   translation apparatus upon which said rotation apparatus is mounted; and
   means for controlling said rotation apparatus and said translation apparatus.

4. The renewable laser target of claim 1, further comprising a coating of a selected material and having a chosen thickness formed on the outer surface of the rectangular step, whereby soft x-rays having selected wavelengths are generated.

5. A method for generating a renewable, laser-pumped target for generating soft x-ray radiation, comprising the steps of:
- forming a helical step having a rectangular cross section in the outer surface of a cylindrical body on which a pump-laser beam target area is defined for a chosen pump-laser beam geometry, said cylindrical body having an axis of symmetry;
- incrementally rotating said cylindrical body about the axis of symmetry thereof; and
- advancing said cylindrical body along the axis of symmetry thereof with each incremental rotation of the cylindrical body, such that the pump-laser beam target area is refreshed while maintaining the chosen pump-laser beam geometry with each incremental rotation of the cylindrical body.

6. The method of claim 5 further comprising the step of coating the outer surface of the rectangular step with a selected material having a chosen thickness, such that selected wavelengths of soft x-radiation are generated.

7. A renewable, laser-pumped laser target for generating soft x-ray radiation, comprising in combination:
- an elongated body having a polygonal cross section with flat faces, an axis of symmetry, and an outer surface on which a pump-laser beam target area is defined for a chosen pump-laser beam geometry;
- means for rotating said elongated body about the axis of symmetry thereof, thereby exposing a different face of the polygon such that the pump-laser beam target area is refreshed while maintaining the chosen pump-laser beam geometry; and
- means for translating said elongated body along the axis of symmetry thereof such that the pump-laser beam target area is refreshed while maintaining the chosen pump-laser beam geometry.

8. The apparatus of claim 7, wherein said means for rotating and translating said cylindrical body comprises:
- rotation apparatus;
- translation apparatus upon which said rotation apparatus is mounted; and
- means for controlling said rotation apparatus and said translation apparatus.

9. The renewable laser target of claim 7, further comprising a coating of a selected material and having a chosen thickness formed on the outer surface of said elongated body such that a selected wavelength of soft x-ray radiation is generated.

10. A method for generating a renewable laser-pumped target for generating soft x-radiation, comprising the steps of:
- forming an elongated body having a polygonal cross section with flat outer faces on which a pump-laser beam target area is defined for a chosen pump-laser beam geometry, and having an axis of symmetry;
- rotating the elongated body about the axis of symmetry thereof, thereby exposing a different face of the polygon such that the pump-laser beam target area is refreshed while maintaining the chosen pump-laser beam geometry; and
- translating the elongated body along the axis of symmetry thereof such that the pump-laser beam target area is refreshed while maintaining the chosen pump-laser beam geometry.

11. The method of claim 10, further comprising the step of coating the outer surface of the rectangular step with a selected material having a chosen thickness, such that selected wavelengths of soft x-radiation is generated.

* * * * *